United States Patent [19]
Jain

[11] Patent Number: 6,094,306
[45] Date of Patent: Jul. 25, 2000

[54] ENERGY EFFICIENT WINDOW

[75] Inventor: Kanti Jain, Briarcliff Manor, N.Y.

[73] Assignee: Anvik Corporation, Hawthorne, N.Y.

[21] Appl. No.: 08/047,238

[22] Filed: Apr. 13, 1993

[51] Int. Cl.[7] .............................. G02B 5/18; E05D 15/26; E06B 7/00
[52] U.S. Cl. ........................ 359/568; 359/566; 359/572; 49/125; 52/171.3
[58] Field of Search .................................. 359/558, 566, 359/567, 576, 577, 578, 591, 596, 601, 609, 613, 614, 1, 15, 569, 572, 568; 49/125; 52/1, 171.3, 173.1, 173.3; 160/85, 120, 241

[56] References Cited

U.S. PATENT DOCUMENTS

| | | | |
|---|---|---|---|
| Re. 32,539 | 11/1987 | Jentoft et al. | 52/200 |
| Re. 32,915 | 5/1989 | Jentoft et al. | 52/200 |
| Re. 33,720 | 10/1991 | Cummings | 52/200 |
| 2,280,358 | 4/1942 | Tietig | 160/120 |
| 3,236,290 | 2/1966 | Lueder | 160/241 |
| 3,482,107 | 12/1969 | Hock | 359/497 |
| 4,290,473 | 9/1981 | Pierson | 160/120 |
| 4,368,725 | 1/1983 | McClintock | 126/432 |
| 4,389,085 | 6/1983 | Mori | 359/591 |
| 4,411,493 | 10/1983 | Miller | 359/595 |
| 4,429,952 | 2/1984 | Dominguez | 359/591 |
| 4,522,467 | 6/1985 | Bartenbach | 359/596 |
| 4,600,627 | 7/1986 | Honda et al. | 428/203 |
| 4,710,426 | 12/1987 | Stephens | 428/336 |
| 4,733,505 | 3/1988 | Van Dame | 52/22 |
| 4,765,724 | 8/1988 | Huichun | 359/576 |
| 4,813,198 | 3/1989 | Johnston et al. | 52/171.3 |
| 4,850,682 | 7/1989 | Gerritsen | 359/58 |
| 4,963,206 | 10/1990 | Schacklette et al. | 156/99 |
| 5,009,484 | 4/1991 | Gerritsen | 359/591 |
| 5,027,566 | 7/1991 | Gilowski | 52/18 |
| 5,048,925 | 9/1991 | Gerritsen et al. | 359/569 |
| 5,062,247 | 11/1991 | Dittmer | 52/200 |
| 5,071,232 | 12/1991 | Kato et al. | 359/15 |
| 5,148,643 | 9/1992 | Sampson et al. | 52/200 |
| 5,163,257 | 11/1992 | Crowell | 52/200 |
| 5,164,856 | 11/1992 | Zhang et al. | 359/596 |
| 5,179,630 | 1/1993 | Chang et al. | 359/15 |
| 5,179,992 | 1/1993 | Okarski et al. | 160/327 |

FOREIGN PATENT DOCUMENTS

4175703  6/1992  Japan ..................................... 359/566

*Primary Examiner*—Cassandra Spyrou
*Assistant Examiner*—John Juba, Jr.
*Attorney, Agent, or Firm*—Carl C. Kling

[57] ABSTRACT

An energy saving window system operates selectively in different seasons and climatic conditions to optimize transfer of the sun's radiation through the window into an interior space. Two sets of diffraction gratings are deployed, with two mode settings—a summer or capture mode and a winter or transmittance mode. In the summer mode, transfer of heat into the interior is undesirable. Unwanted heat rays are redirected to a scupper by additive diffraction through two diffraction gratings in series. The scupper redirects the undesired radiation to a heat sink or back out through the window. In the winter mode, transfer of heat into the interior is desirable. By repositioning the two diffraction gratings so that their deflections are subtractive, the sun's rays are redirected to be essentially undiffracted so as to miss the scupper and enter the room. The essentially undiffracted light rays are acceptable as a view and are effectively unblocked as to solar heat gain. Various coatings may be added to the diffraction gratings to increase the window selectivity of light and heat transmissivity. Various feedback control systems may be deployed as sunfollower subsystems to control motorized mechanisms so as to automatically move the diffraction grating windowpanes to maintain an azimuth and direction appropriate for heat gain control of the sun's rays. Mechanisms may also be added to control heat transfer from the scuppers to the outside atmosphere, to a heat sink or to some utilization apparatus.

31 Claims, 3 Drawing Sheets

ENERGY EFFICIENT WINDOW

BACKGROUND OF THE INVENTION

1. Field of the Invention

This invention relates to window systems, and more particularly relates to energy-saving windows using diffraction gratings and spectrally selective coatings in a manner which controls the entry of selected sunlight components, notably heat and light, into a room.

2. Description of Related Art

Window efficiency has a significant impact on energy consumption in both residential and commercial buildings. Windows also affect the thermal and visual comfort of the building occupants. The overall figure of merit for the performance of a window system is a complex function dependent on many variables, including type of building, climate, orientation, and type of use. Whereas for residential buildings the primary and well known element in efficient window design is heat loss control and transmittance of visible daylight, an equally or more important concern for all windows taken in aggregate is efficient, fully dynamic control of solar heat gain, especially in the United States where a majority of regions have plentiful sunlight. This is so because of the greater cost of cooling, both in energy consumption and heating/ventilation/air-conditioning (HVAC) system installation.

A wide variety of techniques have been developed and used for control of solar luminous transmittance, solar heat gain and interior heat loss through windows in residential and commercial buildings. These include fixed and adjustable mechanical methods such as shades, blinds, fins, awnings, slats and louvers; conventional optical techniques such as use of colored low-transmittance glasses; spectrally selective coatings of of single metal layers and dielectric-metal-dielectric multilayer stacks; and chromogenic single- or multilayer structures based on photochromic, thermochromic and electrochromic phenomena. Most of these existing methods have focused on one or more, but not all, features one desires to have in an ideal window, namely. optimum utilization of the luminous portion of the solar radiation, control of the solar infrared radiation, effective heat loss control of the interior heat in winter months, reduced cooling loads in summer months, reduced electrical lighting loads, dynamic control as a function of daily or seasonal climatic variations, user modifiability of optimum parameters, aesthetics of appearance, and, perhaps most importantly, low production costs.

Energy-Efficient Windows: General Considerations

An energy-efficient window is a system capable of controlling the transfer of energy in both directions according to certain desired criteria. In the most basic terms, clearly, a good window should provide the building occupants both optical and thermal comfort while minimizing expended energy. Overall, an optimized window should have the following characteristics:

a. Daylight

It should have good optical transparency to provide a sufficient amount of daylight when desired. In the U.S., approximately 5% of the total national energy consumption can be attributed to electrical lighting. By providing daylight efficiently, windows can favorably influence this segment of the energy bill.

b. Thermal Barrier

It should be a good thermal barrier to minimize heat loss from the interior to the exterior. All three mechanisms of heat loss—radiative, conductive and convective—should be properly controlled to achieve the best thermal resistance.

c. Solar Heat Control

It should have controllable infrared transparency to provide solar heat gain when desired, such as in winter months. At other times, particularly in summer months, it should be able to block solar heat gain. By utilizing solar heat energy effectively, the energy expenditure in heating can be influenced, and by limiting solar heat gain, the energy and system costs associated with cooling requirements can be reduced. It has been estimated that in the U.S., windows account for ~5% of the total national energy expenditure; this includes both the heat loss as described in the preceding paragraph and the added energy costs of cooling due to undesired solar heat gain.

The relative importance of utilizing solar heat gain versus limiting it is clearly a function of the climate. In northern European countries, where the winters are long and cold, and summers short, cloudy and mild, optimization of window performance primarily involves control of the losses of interior heat. But in temperate or warm climates with plenty of sunlight, as in most of the U.S. and the rest of the world, it is more important to control the solar heat gain through windows to minimize the cooling costs. Solar heat gain through windows is often the largest of all cooling load components including internal sources such as lights, office equipment and people. Almost all commercial buildings and an increasing number of modern residential buildings have installed air-conditioning systems. Since electrical energy used for cooling is more expensive than heating energy used in oil or gas furnaces, and since the cost of the air-conditioning systems must be included in the overall cooling expenditure, the net cooling cost is often higher than the net heating cost. Thus, optimum control of solar heat gain through windows can have a significant influence on our total interior climate control costs.

d. Spectral Control

From the ideal characteristics of windows as described above, it is at once clear that the window performance requirements are complex and sometimes mutually conflicting. For example, whereas entry of visible daylight ($\lambda \approx 0.4$–$0.7\,\mu m$) through a window is desirable, the heat gain in the interior, largely by the infrared portion ($\lambda \approx 0.7$–$3.0\,\mu m$) of the solar spectrum, is undesirable. Thus, the window must have the necessary spectral selectivity to transmit visible radiation while blocking infrared wavelengths. As described below, this is accomplished by a variety of glazings and coatings.

However, even when a well-optimized spectrally selective coating is available, there still remains the conflict between the desirability of daylight coupled with solar heat gain in winter months by radiation transfer into the interior, and the undesirability of energy loss by heat transfer out of the interior. It is therefore attractive to have techniques for dynamic control of the energy transfer across the window. Such methods offer the possibility of optimizing the inflow of luminous radiation and both the inflow and the outflow of thermal radiation in accordance with conditions that can vary over the day or the seasons. In the review of the present state of the art in the following section, we will describe the currently available techniques that fall under this category.

Current Methods for Improving Window Efficiency

A wide variety of techniques have been developed and employed for control of energy transfer through windows. These include various mechanical, thermal and optical methods. In this section we provide a brief review of the currently available technologies and summarize their advantages and disadvantages.

Fixed and Adjustable Mechanical Methods

Most of the mechanical methods are traditional methods that have been in use as long as there have been windows. The most common of these are movable interior sun control devices such as shades, drapes, blinds, etc. Such systems are often selected on the basis of appearance and cost, and only marginally contribute to improving the energy efficiency of the window. Fixed exterior sun control systems, such as awnings and overhangs, are used to block the direct sun while permitting diffuse and indirect daylight to enter the room. However, being fixed, they represent a compromise between solar heat gain control and daylight utilization. This has generated interest in adjustable exterior shading devices. These include movable awnings, fins, slats, louvers and exterior blinds. Both manual and automatic adjustment capabilities are available in such sun control systems. Their primary advantage is that they provide a better compromise than fixed exterior shades between solar heat gain control and daylight utilization. Their disadvantages include high installation and servicing costs, and susceptibility to damage from adverse weather conditions such as snow, rain, frost, and high winds.

A less commonly used technique employs between-glass shading devices. These include both fixed louvers between the two window panes and venetian blinds that can be adjusted without moving or opening the window panes. Such devices are especially suited for air-flow or other gas-filled windows in which they contribute to improved thermal comfort and energy efficiency in both summer and winter. Their chief drawback is cost. Although well known in Europe, such window systems are not common in the United States.

Traditional Optical Methods

Many different optical techniques have been developed for window efficiency improvement. Some of these are conventional optical methods which have been in use for a long time. Others are less common and involve use of various advanced coatings.

A widely used optical method for window sun control consists in using low-transmittance glass. Often the glass is made highly colored and light absorbing by various additives. Whereas this helps in reducing the cooling load in summer months, it also substantially limits available daylight, thereby increasing use of electric lights. It also reduces the beneficial use of solar heat in winter months. Increasingly, window panes are being coated with spectrally selective glazings, which address some of the drawbacks of low-transmittance glasses; such coatings will be described in the following section.

Spectrally Selective Coatings

Since the visible and infrared components of solar radiation are partially separable, it is possible to coat the window panes so that they will transmit the solar luminous radiation ($\lambda \cong 0.4$–$0.7$ $\mu$m) while blocking the infrared portion of the solar spectrum ($\lambda \cong 0.7$–$3.0$ $\mu$m). Since the distribution of solar radiation among the above two spectral regions is approximately equal, in principle it is possible to prevent approximately half of the solar energy from entering the interior without impacting the daylight or luminous transmittance of the window. Such spectrally selective coatings or glazings are now widely applied commercially to vast numbers of windows. They are typically thin layers of a free-electron metal, such as copper, silver or gold. Often, the luminous transmittance is boosted by sandwiching the metal layer between two layers of high-refractive-index dielectric materials. Both glass and various plastics have been used as the substrates for such coatings. Note that whereas spectrally coated windows are significantly more energy-efficient than uncoated glass, they still fall short of the best achievable performance because they do not provide dynamic control under different climatic conditions.

Since optimization of solar radiation control depends on the incidence angles of the sun, it is also possible to design the spectrally selective coatings to operate optimally at certain specific incidence angles. These angles will clearly be at the inclination when solar intensity is near its peak during daylight hours, and therefore, at other times the performance of such coatings will be less than optimum.

In cold climates it is also important to provide good thermal insulation to prevent loss of interior heat through the wvindows. This is done by using dielectric-metal-dielectric glazings which are optimized to provide high reflectivity at longer wavelengths (3–50 $\mu$m spectral region). Coatings for good thermal insulation and good solar luminous transmittance have also been made by applying thin layers of certain heavily doped oxide semiconductors, such as $SnO_2$:F, $In_2O_3$:Sn and ZnO:Al. It should be noted that as additional coatings on existing or new panes become necessary to achieve control of different spectral regions, the window cost increases significantly.

Chromogenic Coatings

The most desirable function in a coated window is dynamic control of heat gain and loss as well as luminous transmittance as a function of varying conditions during the day or with seasons. Many types of such 'smart' coatings have been developed and fall under the broad category of chromogenic coatings. These include photochromic, thermochromic and electrochromic coatings. Photochromic coatings undergo change in their transmittance properties as the intensity of the radiation incident on them changes. Photochromic sunglasses are a well known example of such a coating. However, for large-scale application to building windows, economical photochromic coatings with satisfactory performance (i.e., a full dynamic range of optical and thermal control) are not yet readily available.

The optical properties of thermochromic coatings are determined by temperature changes. Thermochromism is known to exist in many inorganic and organic materials. A common example of a thermochromic coating is provided by nematic liquid crystal temperature displays. Many transition metal oxides are attractive candidates for producing thermochromic layers, $VO_2$ being a particularly well-investigated material. As its temperature increases above a certain critical value, a $VO_2$ coating transforms structurally from semiconducting to metallic, which changes its optical properties in the infrared from transmissive to reflective. Such a coating thus provides an automatic control of solar energy transfer. Although as a single layer device such coatings have the advantage of simplicity, the radiation control they provide is fixed and not user-modifiable. Like photochromic coatings, thermochromic coatings that provide both economy and a full dynamic range of optical and thermal control are not yet readily available for large-scale application.

Electrochromic coatings provide the most versatile functionality in solar radiation control. The phenomenon of electrochromism, which is caused by electrically activated injection or extraction of mobile ions into or from a certain region, is well known in oxides of various transition metals such as W, V, Mo, Ni, Ti, Ir, etc. and many organic materials. Electrochromic coatings for application in smart windows typically have 3–7 layers, more than conventional low-thermal-emissivity and other spectrally selective coatings, which have 1–3 layers. A typical 5-layer electrochromic coating for window application consists of an electrochromic layer, an ion conductor layer and an ion storage layer sandwiched between two transparent contact layers. With a suitable electric current applied through the outer layers, the transmittance of the multilayer electrochromic coating structure can be varied over a wide range, e.g., 20–70%., any change being reversible over thousands of cycles. The issues facing wide application of such coatings are the various cost components associated with large-area deposition of uniform multilayer films and their impact on the overall window cost.

Limitations of Current Window Technologies

Limitations of the existing window technologies include:

(a) Movable interior mechanical systems such as shades, blinds and drapes do not offer selectivity between the visible and infrared portions of the solar spectrum. Such devices are primarily selected on the basis of appearance and cost, providing only marginal improvement in the energy efficiency of the window.

(b) Fixed exterior sun control devices such as awnings and overhangs require the user to compromise between solar heat gain control and daylight utilization.

(c) Movable exterior systems, e. g., fins, slats and louvers are high in installation and service costs, and also have the disadvantage of being susceptible to damage from adverse weather conditions such as snow, rain, frost, and high winds.

(d) Low-transmittance glass windows, while reducing the cooling loads in the summer months, also limit the available daylight. In winter months, when the solar heat gain may be desirable, the low-transmittance feature cannot be conveniently deactivated.

(e) Spectrally selective coatings designed for high transmittance in the luminous portion of the solar spectrum and high reflectance in the infrared portion make a window highly efficient in summer months, but do not provide dynamic control of the solar heat gain under different climatic conditions.

(f) Photochromic and thermochromic coatings provide limited dynamic control of solar heat gain and luminous transmittance, but such control is automatic and not user-modifiable. Further, for large-scale application to building windows, economical photochromic and thermochromic coatings with satisfactory performance (i.e., a full dynamic range of optical and thermal control) are not yet readily available.

(g) Electrochromic coatings, while providing the greatest functionality in optimization of solar radiation utilization in terms of dynamic range and user control, have the disadvantage of high costs due to requirement of uniform, large-area deposition of several layers (typically 5).

From the above list, it is clear that the existing techniques for improving energy efficiency of windows suffer from major limitations. Ideally, whereas a window should provide a full dynamic range of control of heat gain, luminous transmittance and heat loss, as well as user-modifiability, it should also be cost-effective to produce.

SUMMARY OF THE INVENTION

It is the object of the invention to provide a novel energy-efficient window technology that effectively addresses the shortcomings of existing window systems, permitting full dynamic control of solar heat gain through the window, in both summer and winter modes.

Another object of the invention is to reduce both cooling and heating loads resulting from heat transmission through a window, while providing good luminous transmittance and thereby keeping the electrical lighting costs down.

A feature of the invention is a set of very economically produced diffraction gratings, which are designed and mounted in such a way that incoming radiation in any spectral region can be accepted or rejected by the window.

Another feature of the invention is that the dynamic control of the window transmittance is user modifiable.

An advantage of the invention is that it provides an energy-efficient window system which is able to combine novel energy transmittance control techniques with traditional methods of thermal transfer control, making highly energy-efficient window systems easy to make and install.

Another advantage of the invention is that the energy-efficient window can be so designed that its operation is optimized for different solar inclinations, building structures and locations.

Other objects, features and advantages of the invention will be apparent from the following written description, claims, abstract and the annexed drawings.

BRIEF DESCRIPTION OF THE DRAWINGS

FIGS. 5a and 5b are side elevation views of a large energy-efficient window system incorporating the invention in which the window consists of multiple segments, each operating in the same manner as the window of FIG. 1. FIG. 5a shows all segments in solar heat rejection mode. FIG. 5b shows one of the segments in transmittance mode to provide a good direct view at eye level.

DESCRIPTION OF THE PREFERRED EMBODIMENT

Figure 1:
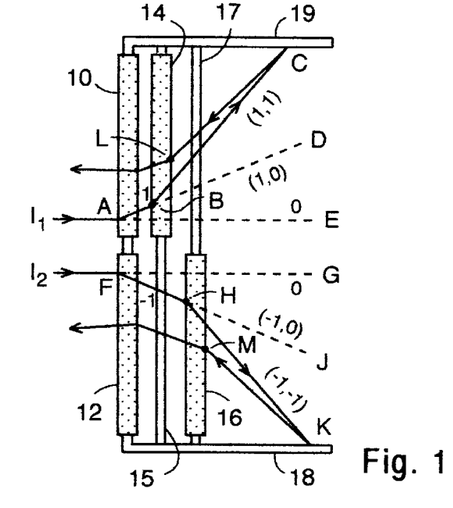
FIG. 1 is a side elevation of the preferred embodiment of a window system incorporating the invention in solar heat rejection mode, also termed summer mode and capture mode.

The energy efficient window system in its preferred embodiment is schematically illustrated in FIG. 1. The basic window structure consists of four panes, denoted by 10, 12, 14 and 16. Two of these panes (10 and 12) are fixed and the other two (14 and 16) are movable on guides or tracks (15 and 17). In other embodiments, the movable diffraction grating windowpane may be mounted for rotation with respect to the fixed diffraction grating windowpane, as illustrated in FIG. 13. Each of the windowpanes is a diffraction grating designed as described below. The panes are housed in a window frame which is designed to have scuppers (18 and 19) of a certain length. The inside surfaces of the scuppers are also made of diffracting sheets, as described below.

The operation of the window is explained as follows. Let us begin with the window configuration in summer months or at any time that it is desired to minimize solar heat gain. Let $I_1$ and $I_2$ represent two of the rays of sunlight entering the room. For ease of illustration, these rays are depicted in FIG. 1 to be normal to the window; we will later show that other angles of incidence can also be made acceptable. Diffraction grating 10 is so designed that (a) incident ray $I_1$ is diffracted into its various diffraction orders 0 (AE),+1 (AB), etc., and (b) the diffracted intensity into the +1 order (ray AB) is maximized. Ray AB is now incident on grating 14, which diffracts it into its various diffraction orders: the 0 order (1,0) is shown as BD and the +1 order (1,1) as BC. Again, grating 14 is fabricated in such a way that the diffracted intensity into the +1 order (ray BC) is maximized. Cumulatively, the gratings 10 and 14 and the scupper 19 are so designed that ray BC is sufficiently deviated from incident direction $I_1$ that it hits scupper 19. Scupper 19 has a diffracting surface which is so fabricated that it diffracts the incident ray BC into ray CL, i.e., it acts as a retroreflector for ray BC, enabling ray CL to exit through the window. Solar heat gain by sunlight entering the interior is thus practically eliminated. Alternatively, scupper 19 can be an absorbing surface. With conventional water or air conduction techniques, the absorbed heat can be gainfully utilized, such as for water heating or heating shaded areas, or it can be stored for later use or converted into alternate forms of energy or discarded into a suitable heat sink.

Similarly, the diffraction gratings 12 and 16 are designed to deflect incident ray $I_2$ so that it hits scupper 18. First the grating 12 diffracts $I_2$ into its various diffraction orders 0 (FG), −1 (FH), etc., of which the −1 order (ray FH) is maximized. Next, the grating 16 diffracts ray FH into its various diffraction orders: the 0 order (ray HJ, denoted (−1,0)), the −1 order (ray HK, denoted (−1,−1)), etc. Of these, intensity into the (−1,−1) order ray HK is maximized. As before, the scupper 18 is designed to either retroreflect ray HK into ray KM which exits through the window, or absorb ray HK, again preventing solar heating of the interior.

Figure 2:
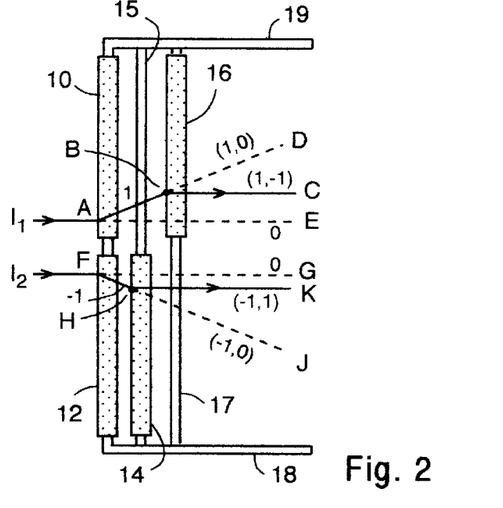
FIG. 2 is a side elevation of the preferred embodiment of a window system incorporating the invention in solar heat acceptance mode, also termed winter mode and transmittance mode.

Let us now describe the window configuration in winter months or at any other time when one desires to gain heat from solar radiation to add to the interior heat. In this window concept, all one has to do is slide the panes 14 and 16 along tracks 15 and 17 to their respective other ends, as illustrated in FIG. 2. Now incident beam $I_1$, after diffraction by pane 10 into its first diffraction order as ray AB, is diffracted again by pane 16, but now into its (−1)st order as ray BC, also denoted as (1,−1). Note that because of the equal deflections in opposite directions by panes 10 and 16, ray BC is parallel to the incident beam $I_1$, thus entering the interior without striking the scupper 19, thereby permitting solar heat gain in the interior. The situation with beam $I_2$ is similar: a first diffraction by pane 12 diffracts it into its (−1)st order as ray FH, which is then diffracted by pane 14 into its (+1)st diffraction order as ray HK, also denoted as (−1,1). As before, ray HK is not intercepted by scupper 18 and is therefore gainfully utilized for solar heating of the interior. Since panes 10 and 14 are optimized to diffract maximum intensity into the (+1)st orders and panes 12 and 16 are optimized to diffract maximum intensity into the (−1)st orders, the amount of sunlight entering the room is maximized in this window configuration.

Diffraction Grating Fabrication Techniques

The diffraction grating window panes described above can be fabricated very economically in high volumes. Since the performance requirements on such gratings primarily amount to deflection by a certain angle +/− a few (~2–5) degrees, the fabrication tolerances are very lenient. They can therefore be conveniently and economically produced by mass production techniques. A complete diffraction grating window pane may be made as a laminate consisting of a plane glass pane and a thin diffraction grating sheet stamped on a suitable plastic material such as acrylic. The diffraction grating sheet may be affixed to the glass pane using a suitable adhesive. In addition to acrylic. other material options for the grating sheet include cellulose triacetate, cellulose acetate butyrate and polyester or mylar (PET, poly(ethylene teraphthalate)).

For the high-volume stamping process, first a master grating is made on a hard substrate, e.g., a metal plate, by conventional grating ruling techniques. The grating ruling parameters are determined to maximize the diffraction intensity into the +1 or −1 order, as desired. The master grating can now be used to stamp large numbers of gratings on sheets of various plastic materials described above. Another well known mass replication technique is injection molding. We remark that these processes are essentially very similar to high-volume manufacturing processes used in the fabrication of a variety of products that consist of surface relief patterns such as zone plates, Fresnel lenses and optical data storage disks including music compact disks (CDs). To illustrate the economical nature of such manufacturing processes, it is useful to note, for example, that although the retail price of a music CD is ~$15, its production cost is no more than ~50–70 cents.

Figure 3:
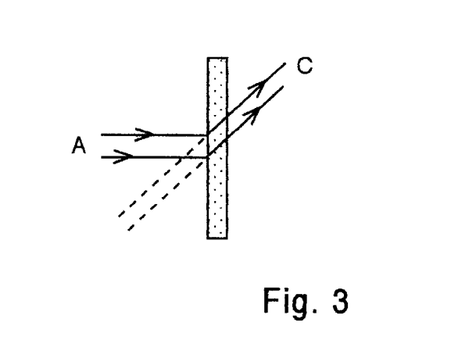
FIG. 3 shows an alternative embodiment of the invention in which a holographic panel is used as the beam deflecting element.
Figure 4:
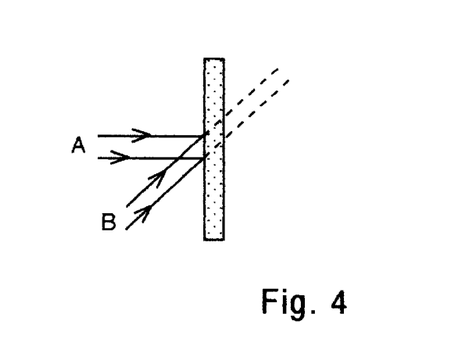
FIG. 4 illustrates a method for creating a hologram using optical interference between two light beams.

An alternative to the diffraction grating approach is to achieve the desired deflections holographically. Here we produce a suitable surface relief pattern in the plastic material to create a transmissive hologram. The relief pattern is such that the hologram deflects an incident beam A by the desired angle into beam C, as illustrated in FIG. 3. The hologram is produced as shown in FIG. 4. Two beams A and B are interfered at the appropriate angle in a photosensitive medium, such as a photoresist, coated on a suitable substrate such as glass or a metal. After exposure, the resist is developed to reveal the relief pattern. Using a suitable etching process, the pattern is then transferred into the glass or metal substrate, which thus becomes the master hologram. This master can now be used to stamp large numbers of holograms on plastic sheets which are subsequently laminated onto a plane glass window pane as in the case of the diffraction gratings. High-efficiency holograms have been made by such fabrication processes for a variety of other applications.

The operation of the window concept as described with the help of FIGS. 1–4 above has used normal incidence for the sun rays (i.e., the rays are at 90 degrees to the window panes). In practice, the gratings can be optimally designed for any desired angle of incidence by appropriate choice of the groove angle and the pitch of the gratings. In a more advanced configuration, the entire window assembly can be made capable of swiveling in an appropriate housing so that it can be adjusted for the desired angle of incidence during a substantial part of the daylight hours. As a further improvement, such adjustment can be automatically effected by suitable sensors, a feedback system and motorized mechanisms.

Figure 5A:
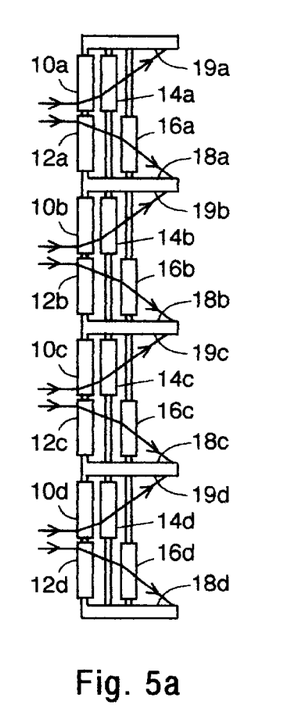
Figure 5B:
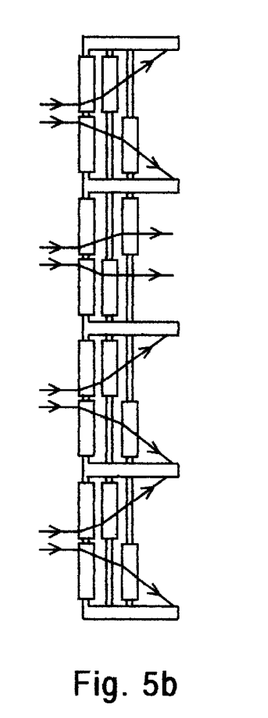

FIGS. 5a and 5b show a variation of the disclosed window concept which is especially suited for large windows. Here the aggregate box frame is made up of several segments, each with its own scuppers. Each segment now independently acts as an energy-efficient window with effective solar heat gain control. As in FIG. 1, each segment consists of four diffraction grating panes, of which two are fixed and two movable. The advantage of such segmentation is that the lengths of the scuppers, as shown in FIGS. 5a and 5b, can be kept manageable; with a single window of the same dimension the scuppers would have been undesirably long. Another advantage is that, as shown in FIG. 5b, one of the window segments at eye level may be set for good direct view while the other segments are set for optimal solar heat rejection.

Spectral Control

Spectral control can be designed into the disclosed window concept as desired. The gratings can be so designed that the operation described in FIG. 1 is optimized for a wavelength near 1 $\mu$m, which will thus reduce solar heat gain while still permitting diffuse visible light to enter the room. Additional spectrally selective glazings for control of reflectance and transmittance in the spectral regions of 0.4–0.7 $\mu$m, 0.7–3.0 $\mu$m and 3–50 $\mu$m, can be incorporated in the window along with its gratings. Other efficiency improvement techniques such as air-flow or evacuated inter-pane spaces can also be beneficially added as desired. These embodiments will be described below.

A potential drawback of the new concept may be degradation of the direct view through the window. In the solar heat blocking configuration (FIG. 1), since most of the solar radiation which was deflected into its +1 or −1 order is returned to the outside, the direct view will be dimmer. However, since the 0-order beams are received undeflected, there will be a direct view, although attenuated. In the transmittance mode, the direct view will be better. A compromise between good solar heat gain control and adequate direct view can be achieved with a segmented window, as described above with reference to FIG. 5b.

Another feature of the disclosed window system that may be considered undesirable by some users is the chromatic dispersion of the visible solar radiation by the gratings. This may create multiple monocolor images as a result of chromatic dispersion in the +1 order, which may be bothersome when the viewer is looking at an attenuated direct view in the 0 order. In a situation where view integrity is required, a segmented window of the type shown in FIGS. 5a and 5b may be used. One may also address the dispersion effects by suitable enhancements in the design of the gratings and the choice of fabrication materials. It is also possible that some users may find the chromatic phenomena attractive from an appearance viewpoint.

Heat Dissipation

Figure 6:
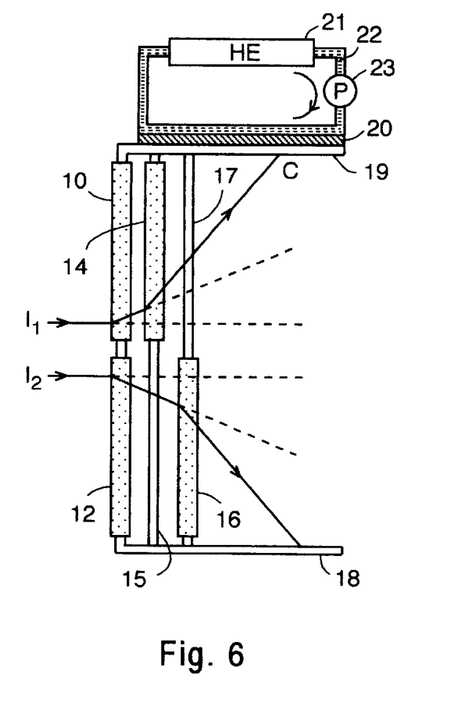
FIG. 6 shows an absorptive heat scupper subsystem with a heat sink and heat transfer means.

FIG. 6 illustrates an embodiment of the invention that incorporates a heat absorbing scupper and means to beneficially utilize the absorbed heat. In this configuration a heat sink 20 is mounted in contact with the scupper 19. The heat received by the heat sink 20 is made available for other useful functions by a heat transfer mechanism (21,22,23). The heat transfer mechanism consists of a suitable fluid 22 (such as air, water, ethylene glycol, etc.) which is circulated in a closed loop by a pump 23; the heat received by the fluid from the heat sink 20 is transferred by a heat exchanger 21 to other parts of the building for a variety of uses, e. g., water heating, conversion to electrical energy for use in air conditioning, or running other appliances.

Figure 7:
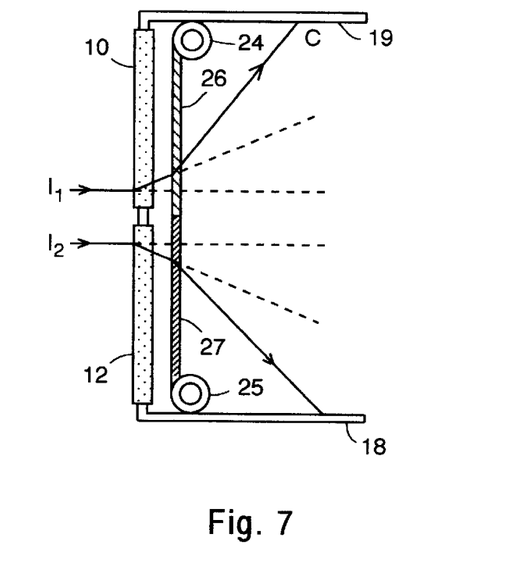
FIG. 7 illustrates an embodiment of the invention incorporating a movable diffraction grating in the form of a roller shade.
Figure 8:
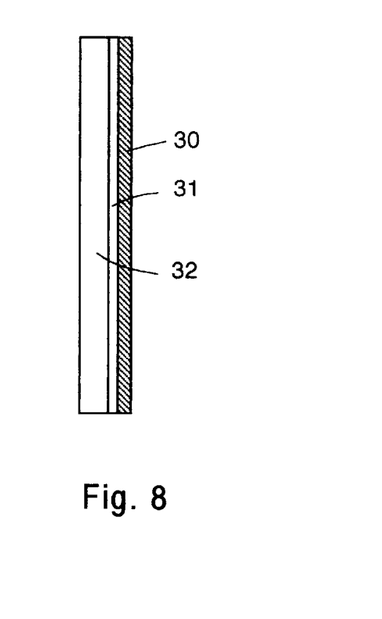
FIG. 8 illustrates in cross section a windowpane according to the invention that combines a diffraction grating member with a spectrally selective optical coating on a substrate.

FIG. 7 shows an embodiment of the invention suited for large-area and low-cost applications. Here the movable diffraction gratings are in the form of a flexible shade mounted on rollers. The fixed diffraction grating windowpanes (10,12) are as before in FIG. 1, but the function of the movable panes 14 and 16 of FIG. 1 is now carried out in FIG. 7 by diffraction grating panels 26 and 27 which are fabricated on a rollable plastic sheeting material such acrylic or polyester. The panels 26 and 27 have their grooves so produced that their deflection characteristics correspond, respectively, to the deflection characteristics of the movable windowpanes 14 and 16 of FIG. 1. The flexible diffraction grating sheet (26,27) in FIG. 7 is rollable by rollers 24 and 25. In FIG. 7 we have depicted, as in FIG. 1, the heat rejection mode. For heat acceptance or transmittance mode, the flexible grating sheet is rolled down such that the panel 26 takes the place of panel 27, and the position of panel 26 is taken by a newly unrolled section of the diffraction sheet which is identical to panel 27; the new configuration then corresponds to the transmittance mode illustrated in FIG. 2. Such an embodiment in which low-cost diffraction grating panels are fabricated on flexible plastic sheets and operated by roller mechanisms are especially attractive for large-area applications such as greenhouses. Also, as before, suitable optical coatings or other surface treatments may be applied to the grating panels for the desired spectral control. As an example, for greenhouses one may desire to have a coating that is capable of selectively transmitting ultraviolet radiation. FIG. 8 illustrates in cross section a windowpane according to the invention that combines a diffraction grating member 30 with a spectrally selective optical coating 31 on a glass substrate 32.

Figure 9:
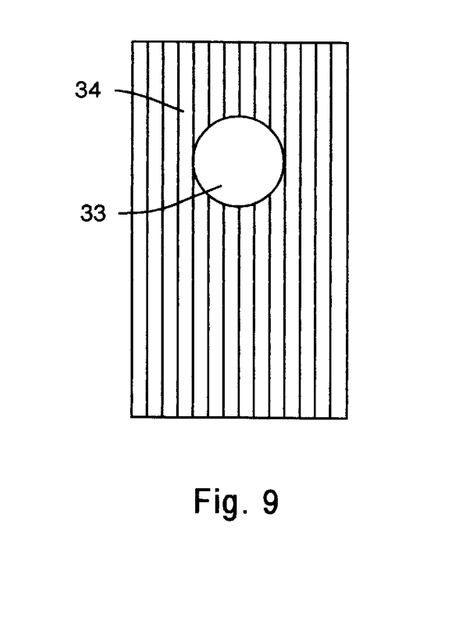
FIG. 9 shows a diffraction grating windowpane incorporating a viewport that deflects incident rays minimally and provides a good direct view.
Figure 10:
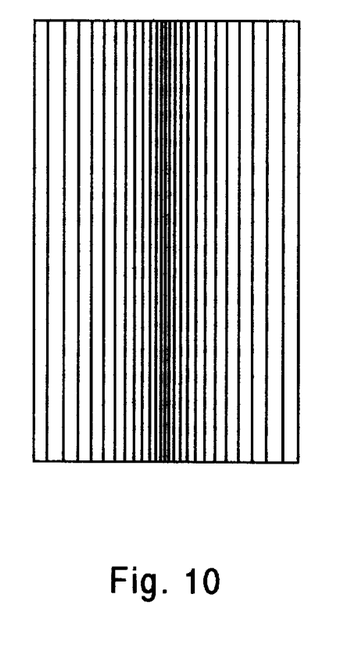
FIG. 10 is an illustration of a diffraction grating windowpane whose deflection characteristics are made variable across its width by fabricating the diffraction grating with a variable spatial frequency of grooves.

In FIG. 9 I illustrate how a viewport 33 may be fabricated as a segment in one of the windowpanes 34. The viewport is such that it causes minimum deflection of the incident rays, thereby providing a good direct view of the exterior. FIG. 10 shows a diffraction grating windowpane whose deflection characteristics vary across one of its dimensions, so as to direct most of the diffracted rays to a scupper, thereby permitting reduction in the size of the scupper. Such varying deflection characteristics may be obtained by fabricating the diffraction grating with varying groove pitch and/or groove angle.

Figure 11:
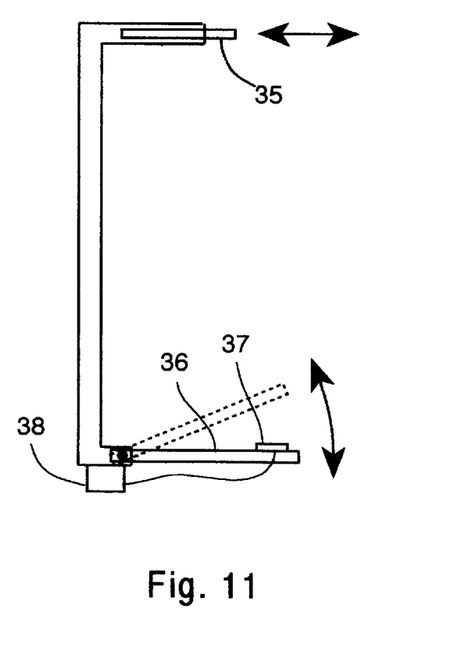
FIG. 11 shows a window in which a scupper is made retractable to provide different positions. It also shows a scupper which is tiltable and whose position is controlled by a heat sensor and a motorized mechanism.
Figure 12:
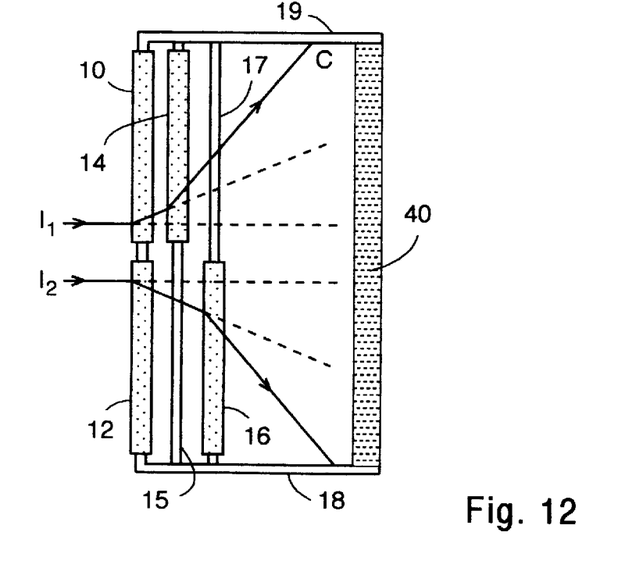
FIG. 12 illustrates a window system in which the scuppers are contained within an enclosed space formed between the diffraction grating windowpanes and an additional pane.

As additional variations in the above embodiments, the scuppers may be made retractable and/or tiltable. FIG. 11 illustrates a window system with a retractable scupper 35 and a tiltable scupper 36. The scuppers may also be enclosed between the diffraction grating windowpanes and an additional pane 40, thereby providing a fully enclosed window system, as shown in FIG. 12. Additionally, the positions of the movable diffraction grating windowpanes or panels and/or the scuppers can be selected automatically by a sensor system which detects the angle of the sun's rays and implements a choice between heat gain or heat rejection modes. For example, a scupper 36 whose tilt is controllable with a heat sensor 37 and motorized mechanism 38 is shown in FIG. 11.

The invention has been shown preferably in the form of a set of diffraction grating windowpanes selectively arrayed to diffract light beams additively to heat-dissipating or reflecting scuppers in summer mode, or to diffract light beams subtractively into the room in winter mode, bypassing the scuppers, with optional spectral coatings for further selectivity of light and resultant heat passable into the room. To those skilled in the art, however, it will be clear that the modifications described above and other modifications, whether described as alternatives or not, will be apparent, without departing from the spirit and scope of the invention, as described in the following claims:

What is claimed is:

1. A transmissively controllable energy efficient window system for controlling radiation entering an interior space, comprising:
   a) a fixed diffraction grating windowpane (10) capable of deflecting the infra-red spectral component of an input radiation beam by a certain range of angles;
   b) a movable diffraction grating windowpane (14) capable of deflecting the infra-red spectral component of an input radiation beam by a certain range of angles, and selectively juxtaposable in or out of optical series with said fixed diffraction grating windowpane (10) so as to either permit at least some of said infra-red spectral components of the beam deflected from said fixed windowpane to enter the interior space or to deflect the beam further so as to prevent said infra-red spectral components from entering the interior space; and
   (c) a window frame for holding said fixed diffraction grating windowpane and said movable diffraction grating windowpane in adjacent parallel planes.

2. A transmissively controllable energy efficient window system according to claim 1, wherein at least one of said diffraction grating windowpanes (10,14) is configured with a plurality of sections having differing deflecting characteristics.

3. A transmissively controllable energy rejecting window system according to claim 2, wherein at least one of said sections of said diffraction grating windowpanes (10,14/34) is configured with deflection characteristics which provide a viewport (33) of greater transmittance than that of the other sections of said diffraction grating windowpanes (10,14/34).

4. A transmissively controllable energy efficient window system according to claim 1, wherein said movable diffraction grating windowpane (14) is a flexible membrane (26, 27) mounted on a roller (24,25) for selective repositioning parallel to said fixed diffraction grating windowpane (10).

5. A transmissively controllable energy saving window system according to claim 1, comprising sunfollower means to follow a moving source of sunlight to provide motion control signals, related to at least one of azimuth and direction of the sun with respect to at least one of said diffraction grating windowpanes (10,14), and comprising diffraction grating movement means to provide motion to at least one of said diffraction grating windowpanes, responsive to said sunfollower means to move said diffraction grating windowpane as a function of the relative movement of the sun with respect to said fixed diffraction grating windowpane.

6. A transmissively controllable energy efficient window system according to claim 1, comprising in addition a spectrally selective (31) coating upon at least one of said diffraction grating windowpanes (10,14/30).

7. A transmissively controllable energy efficient window system according to claim 1, wherein at least one of said diffraction grating windowpanes (10,14) comprises a transparent panel with an adherent diffraction grating plastic film.

8. A transmissively controllable energy efficient window system according to claim 7, wherein said adherent diffraction grating plastic film has a smooth side and a grooved side, with said grooved side being the adherent side.

9. A transmissively controllable energy efficient window system for controlling an input beam of radiation entering an interior space, comprising:
   a) a fixed diffraction grating windowpane (10) capable of deflecting a selected band of incident radiation beam by a certain range of angles;
   b) a movable diffraction grating windowpane (14), capable of deflecting a selected band of incident beam by a certain range of angles, and selectively juxtaposable in and out of optical series with said fixed diffraction grating windowpane (10), the deflections of said fixed and said movable windowpanes (10,14) being algebraically additive, so as to provide a set of deflection vectors for the input radiation beam passing through said fixed and said movable windowpanes (10,14);
   c) a radiation scupper (19) mounted at an angle to the planes of said fixed and said movable diffraction grating windowpanes (10,14); and
   (d) a window frame for holding said fixed diffraction grating windowpane and said movable diffraction grating windowpane in adjacent parallel planes,
   whereby an input beam of radiation is selectively deflected so as to either strike or miss said radiation scupper (19).

10. A transmissively controllable energy efficient window system, according to claim 9, wherein said radiation scupper (19) is energy absorbing.

11. A transmissively controllable energy efficient window system, according to claim 10, comprising in addition:
    d) a heat sink (20) operatively connected to said energy absorbing radiation scupper (19).

12. A transmissively controllable energy efficient window system, according to claim 10, wherein said system includes a receiver of heat and wherein said energy absorbing radiation scupper (19) comprises means (21) to accomplish heat transfer from said radiation scupper (19) to said receiver of heat.

13. A transmissively controllable energy efficient window system, according to claim 12, wherein said means to accomplish heat transfer comprises a heat transfer fluid (22) and means (23) to direct its flow between said radiation scupper and said receiver of heat.

14. A transmissively controllable energy efficient window system according to claim 9, wherein said radiation scupper (19) is energy reflecting.

15. A transmissively controllable energy efficient window system, according to claim 14, wherein said energy reflecting radiation scupper (19) redirects the radiation impinging on it back through said fixed diffraction grating windowpane (10).

16. A transmissively controllable energy efficient window system, according to claim 14, wherein said energy reflecting radiation scupper (19) comprises a diffraction grating for redirecting the radiation impinging on it.

17. A transmissively controllable energy efficient window system, according to claim 14, wherein said energy reflecting radiation scupper (19) comprises a mirrored surface at an angle for redirecting the radiation impinging on it.

18. A transmissively controllable energy efficient window system, according to claim 9, wherein at least one of said diffraction grating windowpanes (10,14) is configured with a range of deflecting characteristics, varying across at least one of its dimensions, so as to deflect incident radiation beams to said radiation scupper (19).

19. A transmissively controllable energy efficient window system according to claim 9, wherein at least one member of the group comprising said diffraction grating windowpanes (10,14) and said radiation scupper (19) is coated for spectral control.

20. A transmissively controllable energy efficient window system according to claim 9, wherein said radiation scupper (35) is movable to provide a plurality of positions with respect to said fixed diffraction grating windowpane (10).

21. A transmissively controllable energy efficient window system according to claim 9, wherein said radiation scupper (36) is movable to alter its angle with respect to the plane of said fixed diffraction grating windowpane (10).

22. A transmissively controllable energy efficient window system according to claim 20, comprising in addition means (37,38) to provide automatic scupper angle control, and wherein said scupper (36) is controllable by said means to provide automatic scupper angle control.

23. A transmissively controllable energy efficient window system according to claim 9, comprising in addition a fixed pane (40) so as to create with said fixed and movable diffraction grating windowpanes (10,14) an enclosed space (41), and wherein said scupper (19) is mounted within said enclosed space (41).

24. A transmissively controllable energy efficient window system, having structural windowpane support means, for controlling radiation entering an interior space, having structural means for supporting a number of windowpanes in a number of parallel planes, the system comprising:

a) two fixed diffraction grating windowpanes with oppositely anged deflection characteristics (10,12) mounted in the structural means;
    b) two movable diffraction grating windowpanes with oppositely angled deflection characteristics (14,16), each mounted in the structural means in planes parallel to and selectively juxtaposable in and out of optical series with a selected one of said fixed diffraction grating windowpanes (10,12) in two modes defined by the relative positions of said movable windowpanes: a capture mode in which the deflections of said fixed and said movable diffraction grating windowpanes (10,14/12,16) are additive, and a transmittance mode in which the deflections of said fixed and said movable diffraction grating windowpanes (10,16,12,14) are subtractive;
    c) two radiation scuppers (18,19) mounted at inclinations to the planes of said fixed and movable diffraction grating windowpanes (10,12,14,16), whereby, in the capture mode, input beams of radiation deflected by said fixed and movable windowpanes (10,12,14,16) strike said scuppers (18,19), and in the transmittance mode, input beams of radiation deflected by said fixed and movable windowpanes (10,12,14,16) bypass said scuppers (18,19).

25. A transmissively controllable energy efficient window system according to claim 24, wherein at least one pair of the group of pairs comprising said diffraction grating windowpanes (10,12/14,16) and said radiation scuppers (18,19) is coated for spectral control.

26. A transmissively controllable energy efficient window system according to claim 24, wherein at least one of said movable diffraction grating windowpanes (14,16) is a flexible sheet (26,27) mounted on a roller (24,25).

27. A transmissively controllable energy rejecting window system, having structural means for supporting a number of windowpanes in a number of parallel planes, the system for controlling radiation entering an interior space, comprising:

a) a set of fixed diffraction grating windowpanes in multiple subsets (10a–d, 12a–d) mounted in the structural means;
    b) a set of movable diffraction grating windowpanes in a plurality of multiple subsets (14a–d, 16a–d), each mounted in the structural means in planes parallel to and selectively juxtaposable respectively related to subsets of said set of fixed diffraction grating windowpanes (10a–d, 12a–d), each juxtaposable respectively in and out of optical series with said related fixed diffraction grating windowpanes (10a–d, 12a–d), the deflections by said fixed and said movable diffraction grating windowpanes in one juxtaposition being additive, to deflect an incident radiation beam passing through said fixed and said movable windowpane diffraction gratings (10a–d, 12a–d, 14a–d, 16a–d) for capture of the energy of radiation by a radiation scupper, and in another juxtaposition being subtractive for transmittance of radiation; and
    c) a set of radiation scuppers (18a–d, 19a–d) mounted at inclinations to the planes of said fixed and movable diffraction grating windowpanes (10a–d, 12a–d, 14a–d, 16a–d), whereby an incident radiation beam passing through at least one of said fixed windowpanes and its related movable windowpane is selectively deflected to their related radiation scupper for capture of the energy of radiation by said radiation scupper.

28. A transmissively controllable energy saving window system for controlling radiation entering an interior space, comprising:

a) a fixed diffraction grating windowpane (10) capable of deflecting an input radiation beam by an angle;
    b) a movable diffraction grating windowpane (14) capable of deflecting an input radiation beam by another angle;
    c) a radiation scupper (19) mounted at an angle to the planes of said fixed and said movable diffraction grating windowpanes (10,14); and
    d) means to selectively support said diffraction grating windowpanes in each of two arrangements wherein,
    in the first arrangement, said fixed diffraction grating windowpane deflects a portion of spectral components of the input radiation beam toward the interior space and said movable diffraction grating windowpane is arranged out of the path of said spectral components;
    in the second arrangement, said movable diffraction grating windowpane is juxtaposed in optical series with said fixed diffraction grating windowpane and said portion of said spectral components is further deflected by said movable diffraction grating windowpane toward said radiation scupper.

29. A transmissively controllable energy saving window system for controlling radiation entering an interior space, comprising:

a) a fixed diffraction grating windowpane (10) capable of deflecting an input radiation beam by an angle;

b) a movable diffraction grating windowpane (14) capable of deflecting an input radiation beam by another angle;

c) a radiation scupper (19) mounted at an angle to the planes of said fixed and said movable diffraction grating windowpanes (10,14); and d) means to selectively support said diffraction grating windowpanes in each of two arrangements wherein, in the first arrangement, said fixed diffraction grating windowpane deflects a portion of spectral components of the input radiation beam along a first deflection vector and said movable diffraction grating windowpane is arranged out of the path of said spectral components;

in the second arrangement, said movable diffraction grating windowpane is juxtaposed in optical series with said fixed diffraction grating windowpane and the deflections of the incident radiation by said fixed and said movable diffraction grating windowpanes (10,14) add algebraically to deflect said portion of said spectral components along a second deflection vector;

whereby said portion of said spectral components deflected along one of said first and second deflection vectors strikes said radiation scupper (19) and said portion of said spectral components deflected along the other of said first and second deflection vectors misses said radiation scupper.

30. A transmissively controllable energy efficient window system, for controlling radiation entering an interior space, having structural means for supporting a number of windowpanes in a number of parallel planes, the system comprising:

a) two fixed diffraction grating windowpanes (10,12) each having a deflection characteristic with respect to its surface normal which is opposite in sense to the deflection characteristic of the other fixed diffraction grating windowpane;

b) two movable diffraction grating windowpanes (14,16), each having a deflection characteristic with respect to its surface normal which is opposite in sense to that of the other movable diffraction grating windowpane, said movable diffraction grating windowpanes disposed in planes parallel to and selectively juxtaposable in optical series with said fixed diffraction grating windowpanes (10, 12) in two modes defined by the relative positions of said movable windowpanes with respect to said fixed windowpanes: a capture mode in which the deflections of said fixed and said movable diffraction grating windowpanes (10,14/12,16) are additive, and a transmittance mode in which the deflections of said fixed and said movable diffraction grating windowpanes (10, 16/12,14) are subtractive;

c) two radiation scuppers (18,19) mounted at inclinations to the planes of said fixed and movable diffraction grating windowpanes (10,12,14,16), whereby, in the capture mode, input beams of radiation deflected by said fixed and movable windowpanes (10,12,14,16) strike said scuppers (18,19), and in the transmittance mode, input beams of radiation deflected by said fixed and movable windowpanes (10,12,14,16) bypass said scuppers (18,19).

31. A transmissively controllable energy saving window system for controlling radiation entering an interior space, comprsing:

a) a set of first fixed diffraction grating windowpanes (10*a–d*);

b) a set of second fixed diffraction grating windowpanes (12*a–d*);

c) a set of first movable diffraction grating windowpanes (14*a–d*);

d) a set of second movable diffraction grating windowpanes (16*a–d*);

e) a set of radiation scuppers (18*a–d,* 19*a–d*) mounted at inclinations to the planes of said fixed and movable diffraction grating windowpanes (10*a–d,* 12*a–d,* 14*a–d,* 16*a–d*): and f) means to selectively position said sets of first and second movable diffraction grating windowpanes in each of two arrangements wherein, in the first arrangement, elements of said set of first movable diffraction grating windowpanes (14*a–d*) mare juxtaposed in optical series with respective elements of said set of first fixed diffraction grating windowpanes (10*a–d*) and elements of said set of second movable diffraction grating windowpanes-anise (16*a–d*) are juxtaposed in optical series with respective elements of said set of second fixed diffraction grating windowpanes (12*a–d*);

in the second arrangement, elements of said set of first movable diffraction grating windowpanes (14*a–d*) are juxtaposed in optical series with respective elements of said set of second fixed diffraction grating windowpanes (12*a–d*) and elements of said set of second movable diffraction grating windowpanes (16*a–d*) are juxtaposed in optical series with respective elements of said set of first fixed diffraction grating windowpanes (10*a–d*), and further wherein, in one of said first and second arrangements, the deflections by said fixed and movable diffraction grating windowpanes are additive to deflect an incident radiation beam passing through both respective fixed and movable diffraction grating windowpanes for capture by an associated radiation scupper, and in the other of said first and second arrangements, the deflections by said fixed and said movable diffraction grating windowpanes are subtractive, to deflect an incident radiation beam passing through both respective fixed and movable diffraction grating windowpanes for transmittance.

* * * * *